(12) United States Patent
Shimamura

(10) Patent No.: US 6,674,542 B1
(45) Date of Patent: Jan. 6, 2004

(54) PRINT CONTROLLER APPARATUS, PRINT CONTROLLING METHOD AND RECORDING MEDIUM

(75) Inventor: Kaoru Shimamura, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/496,054

(22) Filed: Feb. 2, 2000

(30) Foreign Application Priority Data

Feb. 4, 1999 (JP) .......................................... 11-026881

(51) Int. Cl.⁷ .............................. G06F 3/12; G06K 15/02
(52) U.S. Cl. ..................................... 358/1.18; 358/1.15
(58) Field of Search ................................ 358/1.18, 1.9

(56) References Cited

U.S. PATENT DOCUMENTS

| | | | | |
|---|---|---|---|---|
| 5,559,934 A | * | 9/1996 | Ogura et al. .............. | 358/1.11 |
| 5,613,045 A | * | 3/1997 | Morimoto et al. ......... | 358/1.18 |
| 5,825,996 A | * | 10/1998 | Davis et al. .............. | 358/1.12 |

FOREIGN PATENT DOCUMENTS

| | | |
|---|---|---|
| JP | 2-277676 | 11/1990 |
| JP | 5-244398 | 9/1993 |
| JP | 6-64233 | 3/1994 |

\* cited by examiner

*Primary Examiner*—Edward Coles
*Assistant Examiner*—Alan Rahimi
(74) *Attorney, Agent, or Firm*—Staas & Halsey LLP

(57) ABSTRACT

An unprintable area on a label sheet is at first obtained so that a print is not overlapped with the unprintable area on the sheet when laying out print items in cells of a tack sheet etc. It is judged whether or not address data is printed in the unprintable area, and, if a print position of the address data is overlapped with the unprintable area, a print of a fragment of data extending to within the unprintable area is so controlled as to be reduced and moved. Only the fragment of data is set as an object for the control of the reduction, and movement, and hence a well-laid-out print can be attained while making attributes (a size of a character font etc) of the original data reflected therein. In the print control, data that should not be reduced (the size should ne be changed) as in the case of a bar code may be excluded from the object for control.

29 Claims, 19 Drawing Sheets

| ITEM NUMBER | NAME OF TYPE | NAME OF MAKER | SIZE OF SHEET | MARGIN DATA | CELL SPACING | NUMBER OF COLUMNS | NUMBER OF ROWS | CELL SIZE | PRINT AREA |
|---|---|---|---|---|---|---|---|---|---|
| 1 | FF-100 | FUJITSU | WIDTH :210mm HEIGHT:297mm | UPPER :5mm LOWER:15mm RIGHT :8mm LEFT :8mm | COLUMN DIRECTION:2mm ROW DIRECTION:2mm | 3 | 4 | WIDTH: AUTO CALCULATION HEIGHT: AUTO CALCULATION | ADJUSTING TO PRINTER |
| 2 | FF-102 | FUJITSU | WIDTH :210mm HEIGHT:297mm | UPPER:0mm LOWER:0mm RIGHT :0mm LEFT :0mm | COLUMN DIRECTION:0mm ROW DIRECTION:0mm | 3 | 4 | WIDTH :70mm HEIGHT:74.25mm | ADJUSTING TO PRINTER |
| . | | | | | | | | | |
| n | FF-XXX | FUJITSU | WIDTH :100mm HEIGHT:400mm | UPPER:0mm LOWER:0mm RIGHT :0mm LEFT :0mm | COLUMN DIRECTION:0mm ROW DIRECTION:0mm | 2 | 4 | WIDTH: AUTO CALCULATION HEIGHT: AUTO CALCULATION | UPPER :5mm LOWER :5mm RIGHT :8mm LEFT :8mm |

FIG. 13

| ITEM NUMBER | ADDRESS DATA | | STATE OF ADDRESS ITEM | |
|---|---|---|---|---|
| 1 | POST-CODE | 1234657 | POST-CODE | IN-AREA |
| | ADDRESS | OHMARU, INAGI-SHI, TOKYO | ADDRESS | IN-AREA |
| | NAME | FUJI TSUOH | NAME | IN-AREA |
| | DATE OF BIRTH | 1950/5/5 | CUSTOMER BAR CODE | IN-AREA |
| | BAR CODE PRINT | PRINTING | | |
| 2 | POST-CODE | 1234657 | POST-CODE | IN-AREA |
| | ADDRESS | SHIN-YOKOHAMA, KANAGAWA-KEN | ADDRESS | IN-AREA |
| | NAME | FUJI TSUKO | NAME | IN-AREA |
| | DATE OF BIRTH | 1952/6/3 | CUSTOMER BAR CODE | OFF-AREA |
| | BAR CODE PRINT | PRINTING | | |
| ... | | | | |
| n | POST-CODE | 1234657 | POST-CODE | UNDETERMINED |
| | ADDRESS | OHMARU, INAGI-SHI, TOKYO | ADDRESS | UNDETERMINED |
| | NAME | FUJI TSUOH | NAME | UNDETERMINED |
| | DATE OF BIRTH | 1982/4/8 | CUSTOMER BAR CODE | UNDETERMINED |
| | BAR CODE PRINT | NON-PRINTING | | |

| ITEM NUMBER | | ADDRESS DATA |
|---|---|---|
| 1 | POST-CODE<br>ADDRESS<br>NAME<br>DATE OF BIRTH<br>BAR CODE PRINT | 1234657<br>OHMARU, INAGI-SHI, TOKYO<br>FUJI TSUOH<br>1950/5/5<br>PRINTING |
| 2 | POST-CODE<br>ADDRESS<br>NAME<br>DATE OF BIRTH<br>BAR CODE PRINT | 1234657<br>SHIN-YOKOHAMA, KANAGAWA-KEN<br>FUJI TSUKO<br>1952/6/3<br>PRINTING |
| n | POST-CODE<br>ADDRESS<br>NAME<br>DATE OF BIRTH<br>BAR CODE PRINT | 1234657<br>OHMARU, INAGI-SHI, TOKYO<br>FUJI TSUTA<br>1982/4/8<br>NON-PRINTING |

FIG. 15

| ITEM NUMBER | ADDRESS ITEM | START POSITION | START POSITION | END POSITION | END POSITION | CONTROL FLAG |
|---|---|---|---|---|---|---|
| 1 | POST-CODE | 5mm | 5mm | 25mm | 10mm | DISPLAY, MOVABLE, REDUCIBLE |
| 2 | ADDRESS | 5mm | 12mm | 55mm | 22mm | DISPLAY, MOVABLE, REDUCIBLE |
| 3 | NAME | 5mm | 24mm | 55mm | 40mm | DISPLAY, MOVABLE, REDUCIBLE |
| 4 | CUSTOMER BAR CODE | 5mm | 42mm | 55mm | 47mm | NON-DISPLAY, MOVABLE, REDUCIBLE |

FIG. 16

| ITEM NUMBER | ADDRESS ITEM | START POSITION | START POSITION | WIDTH | HEIGHT | CONTROL FLAG |
|---|---|---|---|---|---|---|
| 1 | POST-CODE | 5mm | 5mm | 20mm | 5mm | DISPLAY, MOVABLE, REDUCIBLE |
| 2 | ADDRESS | 5mm | 12mm | 50mm | 10mm | DISPLAY, MOVABLE, REDUCIBLE |
| 3 | NAME | 5mm | 24mm | 50mm | 16mm | DISPLAY, MOVABLE, REDUCIBLE |
| 4 | CUSTOMER BAR CODE | 5mm | 42mm | 50mm | 5mm | NON-DISPLAY, MOVABLE, REDUCIBLE |

| ITEM NUMBER | ADDRESS ITEM | START POSITION | START POSITION | END POSITION | END POSITION | CONTROL FLAG | STATE FLAG |
|---|---|---|---|---|---|---|---|
| 1 | POST-CODE | 5mm | 5mm | 25mm | 10mm | DISPLAY, MOVABLE, REDUCIBLE | IN-AREA |
| 2 | ADDRESS | 5mm | 12mm | 55mm | 22mm | DISPLAY, MOVABLE, REDUCIBLE | IN-AREA |
| 3 | NAME | 5mm | 24mm | 55mm | 40mm | DISPLAY, MOVABLE, REDUCIBLE | IN-AREA |
| 4 | CUSTOMER BAR CODE | 5mm | 42mm | 55mm | 47mm | NON-DISPLAY, MOVABLE, REDUCIBLE | OFF-AREA |

| ITEM NUMBER | ADDRESS ITEM | START POSITION | START POSITION | WIDTH | HEIGHT | CONTROL FLAG | STATE FLAG |
|---|---|---|---|---|---|---|---|
| 1 | POST-CODE | 5mm | 5mm | 20mm | 5mm | DISPLAY, MOVABLE, REDUCIBLE | UNDETERMINED |
| 2 | ADDRESS | 5mm | 12mm | 50mm | 10mm | DISPLAY, MOVABLE, REDUCIBLE | UNDETERMINED |
| 3 | NAME | 5mm | 24mm | 50mm | 16mm | DISPLAY, MOVABLE, REDUCIBLE | UNDETERMINED |
| 4 | CUSTOMER BAR CODE | 5mm | 42mm | 50mm | 5mm | NON-DISPLAY, MOVABLE, REDUCIBLE | |

FIG. 19

PRINT AREA INPUT SCREEN

SHEET UPPER EDGE  _____ mm
SHEET LOWER EDGE  _____ mm
SHEET LEFT EDGE   _____ mm
SHEET RIGHT EDGE  _____ mm

[ OK ]   [ Cancel ]

PRINT CONTROLLER APPARATUS, PRINT CONTROLLING METHOD AND RECORDING MEDIUM

BACKGROUND OF THE INVENTION

The present invention relates to a technology effective in an application to an item print (such as, e.g., an address print etc) of printing items on a single label sheet on which a plurality of seals are laid out in lines.

In recent years, a personal computer generally performs an address print such as a post card, a sealed letter and a label sheet etc.

Incidentally, in a printing apparatus (a printer) of this type of personal computer, the label sheet has an area in which the printing is unable to effect (which will hereinafter be referred to as an unprintable area) in terms of a relationship between paper feed control and drive control of a printing head.

This unprintable area is, to be specific, though different depending on specifications of the printers, a marginal area extending several mm ~2 cm from a side edge of the label sheet, which is used by a paper feed mechanism (a roller) to draw in the sheet and discharge the sheet.

Therefore, if many pieces of information such as, e.g., a post-code, an address, a name and a customer code etc are laid out in one single cell, the cell, if existing at a marginal area of the label sheet, comes to have an unclear print because of a limit by the area unprintable by the printing apparatus.

Namely, when printing the information set in the cell extending to within the marginal area of the label sheet, a print position of the information might encroach on the unprintable area, with the result that there occurs such a phenomenon that the information can not be printed, or contents thereof (characters and images) are printed in discontinuity.

Japanese Patent Application Laid-Open Nos. 2-277676, 5-244398 and 6-64233 disclose technologies of performing the print by reducing the whole data so that the data are well printed in an area and a label on the basis of a label dimension and information on the area printable by the printer.

Those technologies disclosed therein are also capable of printing the data within the printable area (excluding the unprintable area) determined by the specification of the printer, however, the set-by-user information such as a set character font size etc is changed and does not reflect in a result of the print. Further, the whole data undergo the reducing process, and hence there arises a problem that the data, which should not (is not desired to) be reduced, might be reduced.

It is a primary object of the present invention, which was devised to obviate the above problems, to provide a technology capable of printing without being influenced by an area unprintable by a printing apparatus while making set information reflected in the print, and in particular a technology effective in printing on a label sheet including a plurality of seals (cells).

SUMMARY OF THE INVENTION

To accomplish the above object, according to a first aspect of the present invention, a print controlling apparatus comprises a unit for obtaining an unprintable area on a print medium, a unit for judging whether or not data to be printed is printed in the unprintable area, and a unit for controlling, when judging that the data to be printed is printed in the unprintable area, the print of a fragment of data which extends to within the unprintable area.

The unit for controlling the print of the fragment of data may compensate a print position of the fragment of data. The unit for controlling the print of the fragment of data may determine such a movement quantity that the fragment of data does not extend to within the unprintable area, and shift the print position of the fragment of data in accordance with the movement quantity. Further, the unit for controlling the print of the fragment of data may determine such a reduction rate that the fragment of data does not extend to within the unprintable area, and reduce the fragment of data in accordance with the reduction rate.

According to the first aspect of the invention, the data to be printed may be data allocated to each item of a cell composed of a combination of a plurality of items, and the fragment of data may be data allocated to each item.

Thus, only the fragment of data is set as an object for the control of the reduction and movement, and hence a well-laid-out print can be attained while making attributes (a size of a character font etc) of the original data reflected therein.

In the print control, data that should not be reduced (the size should ne be changed) as in the case of a bar code may be excluded from the object for control.

In this case, the unit for controlling the print of the fragment of data may determine such a movement quantity that each item of the cell does not extend to within the unprintable area, and shift a print position of the item in accordance with the movement quantity. Moreover, the unit for controlling the print of the fragment of data may determine such a reduction rate that each item of the cell does not extend to within the unprintable area, and reduce the item in accordance with the reduction rate. Further, in this case, the print controlling apparatus may further comprise a unit for storing a control flag showing whether or not a shift print is allowed per item, and the unit for controlling the print of the fragment of data may shift each item on the basis of the control flag. The print controlling apparatus may further comprise a unit for storing a control flag showing whether or not a reduction print is allowed per item, and the unit for controlling the print of the fragment of data may reduce each item on the basis of the control flag.

On the other hand, the judging unit may judge, based on layout position information of cell items on the print medium, whether or not the data to be printed is printed in the unprintable area.

The data allocated to the cell item may contain a state flag showing whether to extend to within the unprintable area or not, and the judging unit may judge based on the state flag whether or not the data to be printed is printed in the unprintable area.

The unit for obtaining the unprintable area may obtain the unprintable area on the print medium corresponding to a printing apparatus for use.

The print controlling apparatus may further comprise a unit for setting the unprintable area by a user, and the unit for obtaining the unprintable area may obtain the unprintable area set by the user.

According to a second aspect of the present invention, a print controlling method comprises a step of obtaining an unprintable area on a print medium, a step of judging whether or not data to be printed is printed in the unprintable area, and a step of controlling, when judging that the data to be printed is printed in the unprintable area, the print of a fragment of data which extends to within the unprintable area.

In this print controlling method, the step of controlling the print of the fragment of data may involve determining such a movement quantity that the fragment of data does not extend to within the unprintable area, and shifting the print position of the fragment of data in accordance with the movement quantity.

Further, the step of controlling the print of the fragment of data may involve determining such a reduction rate that the fragment of data does not extend to within the unprintable area, and reducing the fragment of data in accordance with the reduction rate. Herein, the data to be printed may be data allocated to each item of a cell composed of a combination of a plurality of items, and the fragment of data may be data allocated to each item. In this case, the step of controlling the print of the fragment of data may involve determining such a movement quantity that each item of the cell does not extend to within the unprintable area, and shifting a print position of the item in accordance with the movement quantity.

Moreover, the step of controlling the print of the fragment of data may involve determining such a reduction rate that each item of the cell does not extend to within the unprintable area, and reducing the item in accordance with the reduction rate.

Furthermore, the step of controlling the print of the fragment of data may involve moving each item on the basis of the control flag showing whether or not a shift print is allowed per item.

Still further, the step of controlling the print of the fragment of data may involve reducing each item on the basis of the control flag showing whether or not a reduction print is allowed per item.

According to a third aspect of the present invention, there is provided a recording medium, readable by a computer, recorded with a program for making the computer execute a step of obtaining an unprintable area on a print medium, a step of judging whether or not data to be printed is printed in the unprintable area, and a step of controlling, when judging that the data to be printed is printed in the unprintable area, the print of a fragment of data which extends to within the unprintable area. The recording medium is a medium on which the program can be magnetically optically recorded, and embraces a magnetic tape, a magnetic disk and magneto-optic disk etc.

Herein, the step of controlling the print of the fragment of data may involve determining such a movement quantity that the fragment of data does not extend to within the unprintable area, and shifting the print position of the fragment of data in accordance with the movement quantity, whereby the program can be recorded in an execution program format. Further, the step of controlling the print of the fragment of data may involve determining such a reduction rate that the fragment of data does not extend to within the unprintable area, and reducing the fragment of data in accordance with the reduction rate, whereby the program can be recorded in the execution program format.

Furthermore, the data to be printed may be data allocated to each item of a cell composed of a combination of a plurality of items, and the fragment of data may be data allocated to each item. In this case, the step of controlling the print of the fragment of data may involve determining such a movement quantity that each item of the cell does not extend to within the unprintable area, and shifting a print position of the item in accordance with the movement quantity, whereby the program can be recorded in the execution program format. Moreover, the step of controlling the print of the fragment of data may involve determining such a reduction rate that each item of the cell does not extend to within the unprintable area, and reducing the item in accordance with the reduction rate, whereby the program can be recorded in the execution program format.

Still further, the step of controlling the print of the fragment of data may involve moving each item on the basis of the control flag showing whether or not a shift print is allowed per item, whereby the program can be recorded in the execution program format.

Yet further, the step of controlling the print of the fragment of data may involve reducing each item on the basis of the control flag showing whether or not a reduction print is allowed per item, whereby the program can be recorded in the execution program format.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which:

FIG. 3 is a diagram showing a layout state of a label sheet where the cells laid out in the marginal area are printed in reduction;

FIG. 12 is an explanatory diagram showing contents of layout information;

FIG. 13 is an explanatory diagram (1) showing contents of direction data;

FIG. 14 is an explanatory diagram (2) showing the contents of the direction data;

FIG. 15 is an explanatory diagram (1) showing contents of cell address item layout information;

FIG. 16 is an explanatory diagram (2) showing the contents of the cell address item layout information;

FIG. 17 is an explanatory diagram (3) showing the contents of the cell address item layout information;

FIG. 18 is an explanatory diagram (4) showing the contents of the cell address item layout information; and FIG. 19 is an explanatory diagram showing an input screen of a print area range.

DETAILED DESCRIPTION OF THE PREFERRED EMBODIMENTS

Embodiment 1

Figure 1:
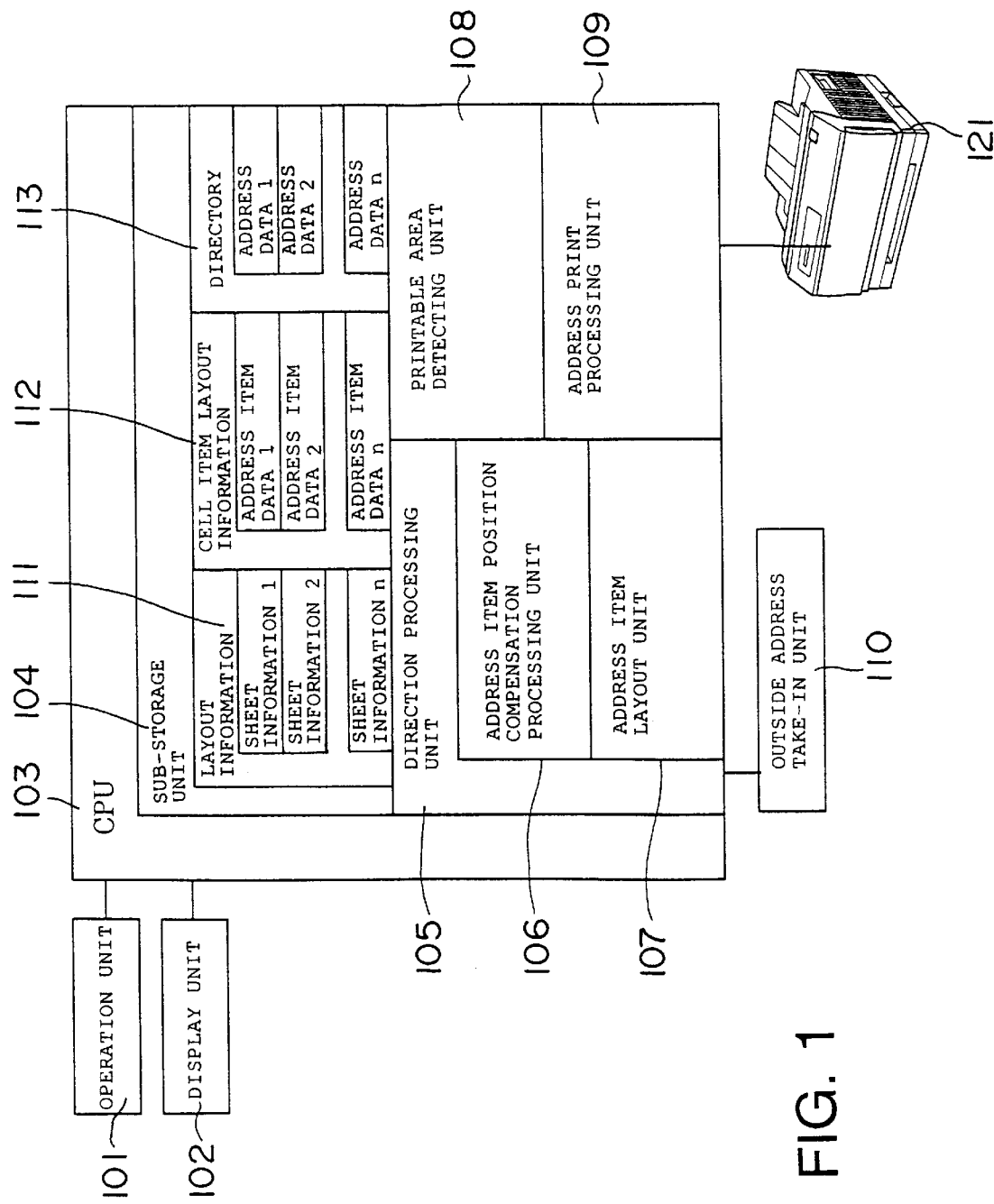
FIG. 1 is a diagram showing a functional structure of an address printing system according to the present invention.

FIG. 1 is a diagram showing a functional structure of an address printing system by way of one embodiment of the present invention.

Referring to FIG. 1, the numeral 101 designates an operation unit which is, to be specific, constructed of a keyboard or a mouse etc. A display unit 102 is constructed of a display device.

A central processing unit (CPU) 103 has the following functions which are, to be specific, actualized by a program given from outside.

A sub-storage unit 104 is composed of a hard disk and a memory (RAM). The sub-storage unit 105 includes a directory processing unit 105. The directory processing unit 105 is constructed of an address item position compensation processing unit 106 and an address item layout unit 107. The address item position compensation processing unit 106 is a functional unit for compensating a position of an address item disposed in each cell, and a specific process there will explained later on. The address item layout unit 107 is a functional unit for determining which items (an address and a name etc) are disposed in the cells and how.

A printable area detecting unit 108 incorporates a function of detecting a printable area in a label sheet from information (corresponding to a marginal field), obtained by an OS (Operating System), on an unprintable area of a printing apparatus 121 and from layout information which will be mentioned later on. Herein, the function by which the OS thus acquires the information on the unprintable area of the printing apparatus connected to the principal units, is known in, e.g., MS-Windows by Microsoft Corp.

An address printing processing unit 109 is defined as a functional unit for sending an indication and print data to the printing apparatus 121.

Note that an interface unit 110 for taking in address data from outside has a function of taking text data such as CSV file formatted data into the present address printing system.

It is also to be noted that the principal units 103–110, which are typical computer-assisted units like being personal computer-assisted, execute processing and control so that a program according to the present invention actualizes the respective functions through these principal units.

The sub-storage unit 104 includes a layout information storage unit 111, a cell item layout information storage unit 112, and a directory data storage unit 113.

The layout information storage unit 111 is stored with the layout information as shown in FIG. 12.

The layout information consists of a type of label sheet, a name of maker, a size of label sheet, margin information, a cell interval, the number of columns, the number of rows, a cell size and a print area. These items of information are based on the information of the printing apparatus 121 which is set by the OS (Operating System), and the information on the marginal area 201 per printer is read from these items of information to the printable area detecting unit 108.

Figure 10:
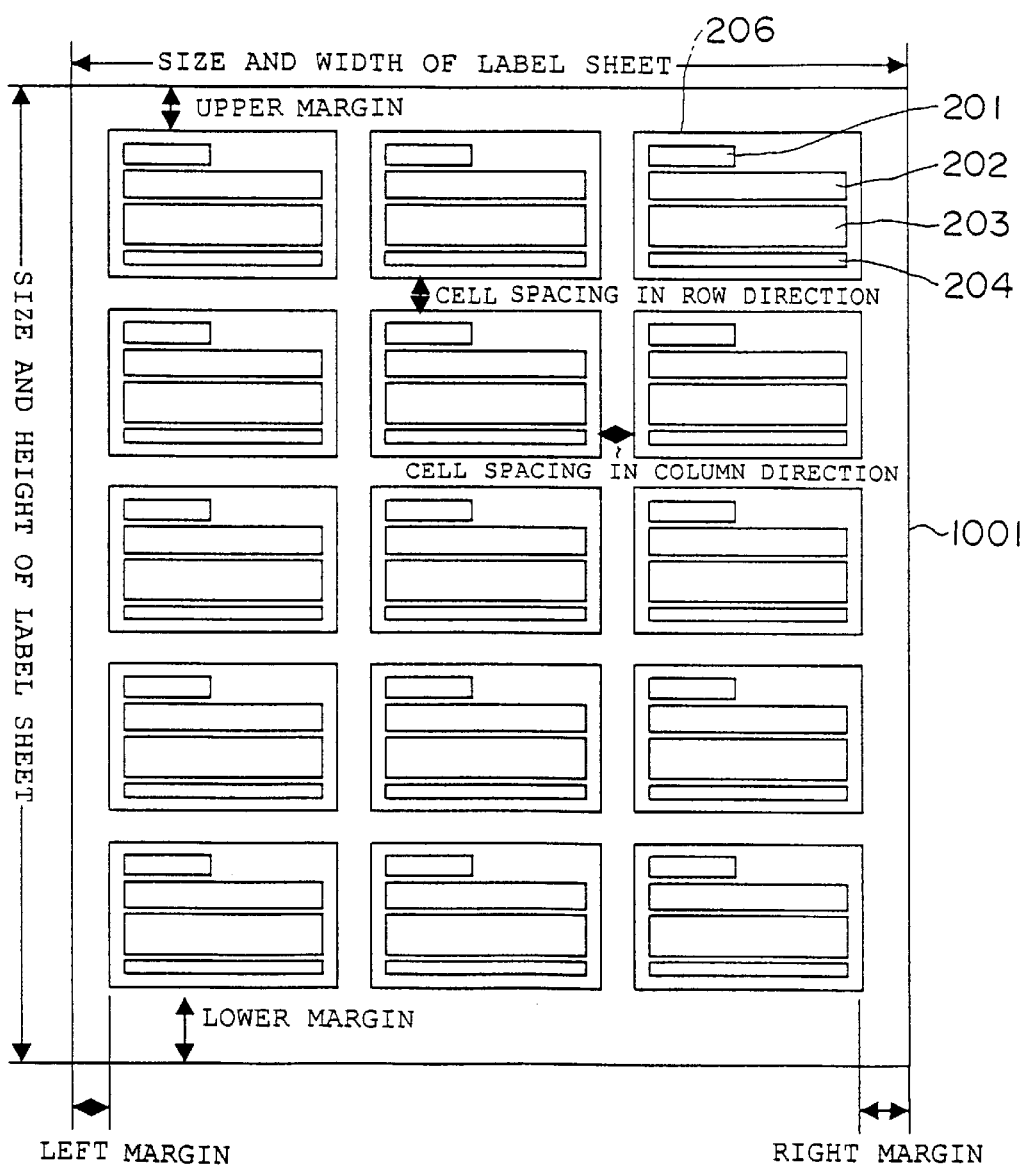
FIG. 10 is a diagram showing a cell layout in a label sheet.
Figure 11:
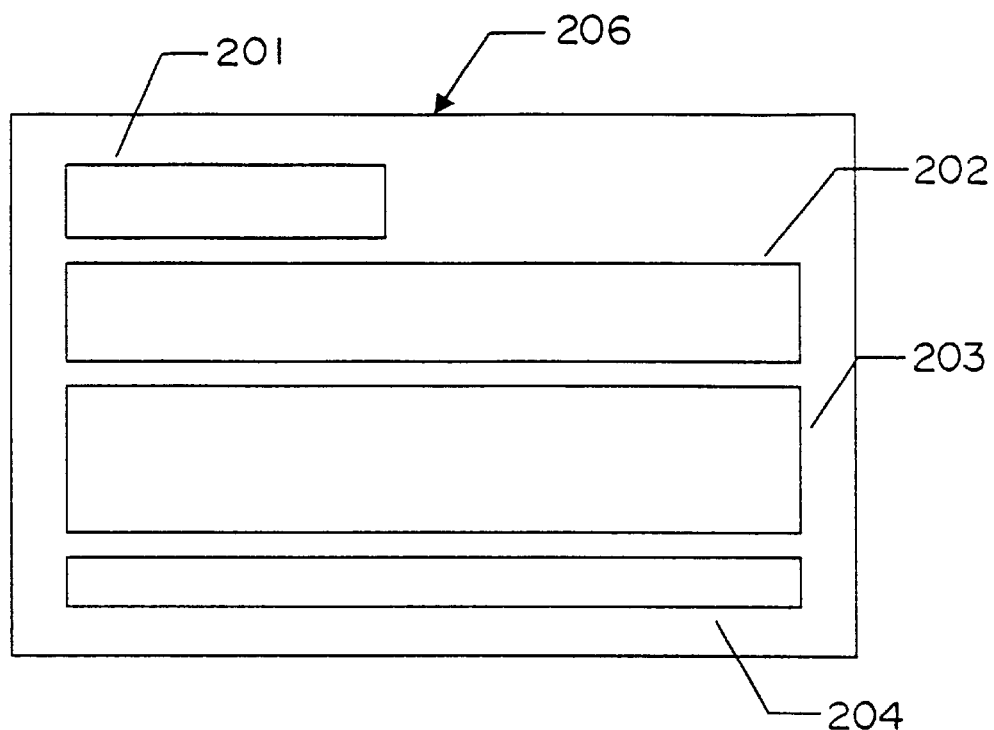
FIG. 11 is a diagram showing a layout of the address items in the cell.

Herein, a relationship between the layout and the cell will be explained referring to FIGS. 10 and 11.

A label sheet 1001 has a size of fixed form such as A4 etc and is composed of a tack sheet of which a right side surface is coated with a silicon oil and a reverse side surface is an adhesive surface. Then, cells 206 are arranged corresponding to each other on this tack sheet. Further, as described above, a post-code item 201, an address item 202, a name item 203 and a customer bar code item 204 are printed on the cell 206 (see FIG. 11). Note that the cells can be arranged in five rows and three columns within a single label sheet in FIG. 10.

The cell item layout information storage unit 112 is stored with cell item layout information as shown in FIGS. 15–18.

Referring to FIG. 15, xy coordinates (distance coordinates on the basis of a left upper point in the cell) of a start-of-print position and an end-of-print position and control flag 1701 can be set in each of the post-code item 201, the address item 202, the name item 203 and the customer bar code item 204 of the cell item layout information. The control flag 1701 contains a flag showing whether a display on the display unit 102 is given or not, its movement is allowed or not, and a reduction thereof is permitted or not, and so on.

Referring to FIG. 16, a print width and a print height of each item are specified in stead of the end-of-print coordinates (x, y) of each item.

Referring to FIG. 17, in addition to the control flag 1701, a state flag 1901 is provided for each item. The state flag 1901 will be explained later on.

Referring to FIG. 18, a print width and a print height of each item are specified instead of the end-of-print coordinates (x, y) of each item shown in FIG. 17.

The directory data storage unit 113 is stored with address data in formats as shown in FIGS. 13 to 16.

FIG. 13 shows a basic data storage format of the address data.

As shown in FIG. 13, the address data consists of items such as a post-code, an address, a name, a date of birth and an implementation or non-implementation of bar code print. Further, the address item state flag 1901 is provided for each of these items, whereby an off-area state or an in-area state is set for each of the address items. This state flag 1901 will hereinafter be described.

FIG. 14 shows another data storage format of the address data. The state flag 1901 may not be set herein.

Figure 2:
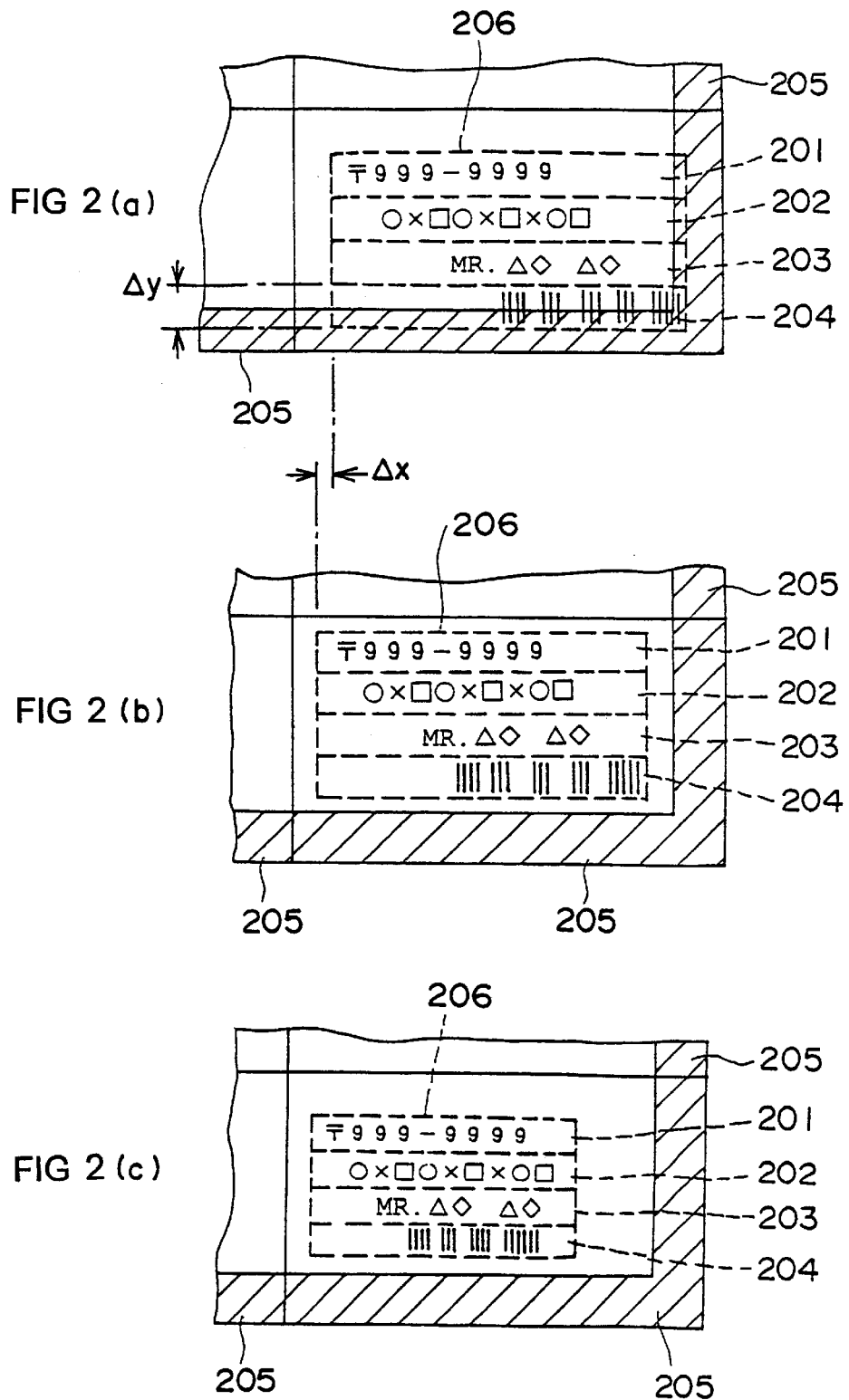
FIG. 2(a) is a diagram showing a state where an address items of a cell are overlapped with a marginal area.
FIG. 2(b) is a diagram showing a state where the address items of the cell are moved.
FIG. 2(c) is a diagram showing a state where the address items of the cell are printed in reduction.

FIG. 2 shows a print state of the marginal area on the label sheet in this embodiment FIG. 2(a) illustrates the print state of the marginal area when in a normal (conventional) address printing process.

Referring to FIG. 2, the cell 206 is positioned downward on the right side on the label sheet 1001, and the marginal area 205 indicates an unprintable area on the label sheet. Herein, a post-code 201, an address 202, a name 203 and a bar code 204 are printed as the address items 201 to 204.

As illustrated in FIG. 2, there is a state where the item of the bar code 204 extends to within the marginal area 205 in this print.

FIG. 2(b) shows a print state where print positions (cells) of the address items at the marginal area are shifted in this embodiment.

As shown in FIG. 2(b), as a result of moving all the address items (cells) upward, leftward and obliquely, the item of the bar code 204 is not overlapped with the marginal area 205.

FIG. 2(c) shows a print state in which the print positions (cells) of the address items at the marginal area are shifted in reduction in this embodiment.

As shown in FIG. 2(c), the address items ((cells) are printed in reduction, and hence the item of the bar code 204 is not overlapped with the marginal area 205.

Figure 3:
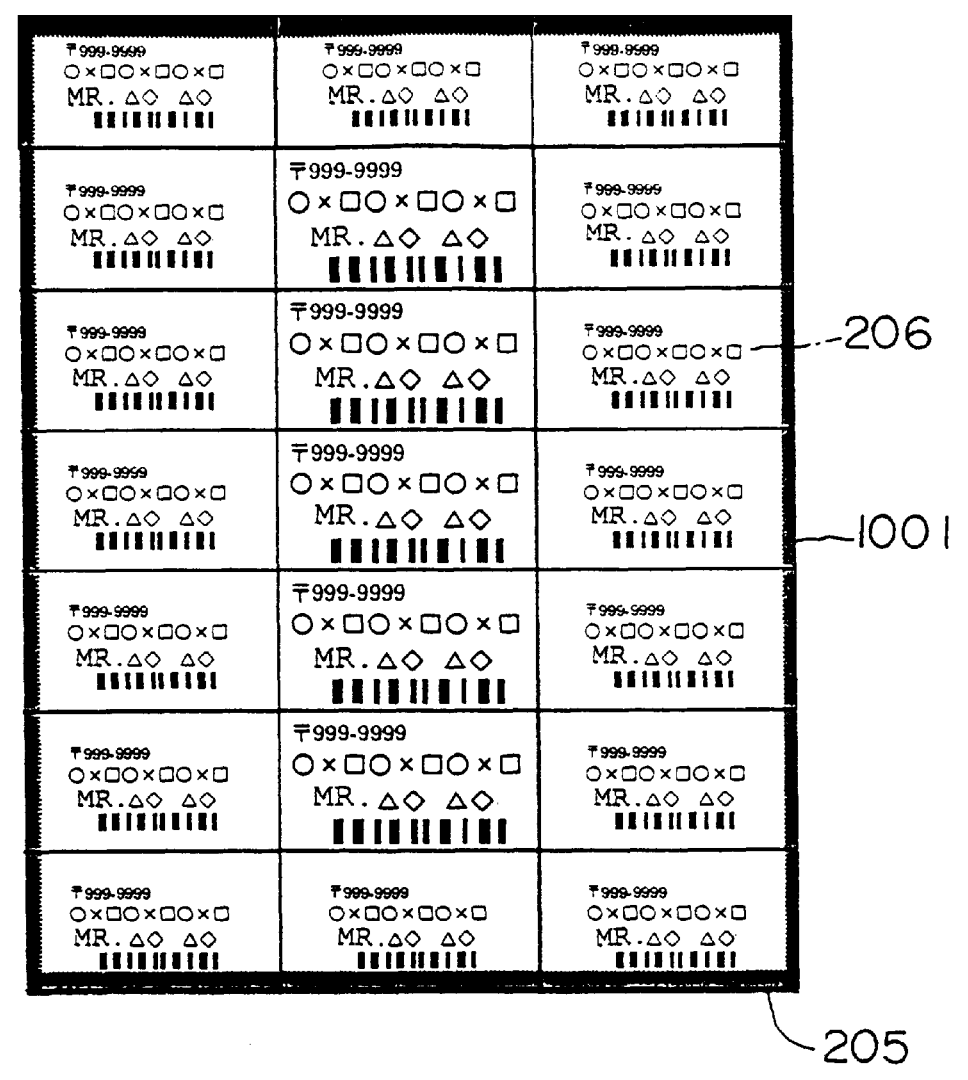
Figure 4:
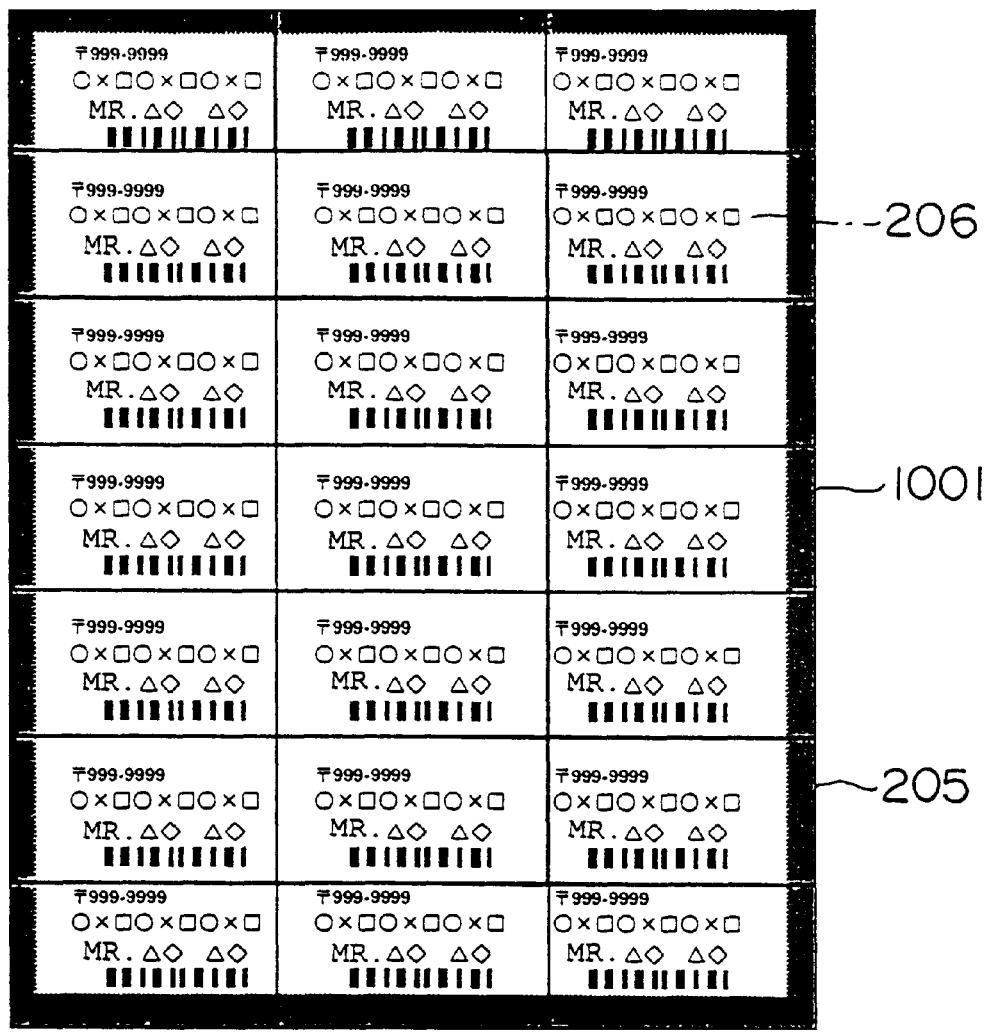
FIG. 4 is a diagram showing a layout state of the label sheet where the cells laid out in the marginal area are moved.

FIG. 3 illustrates a layout of the whole label sheet when the cells at the marginal area are printed in reduction. FIG. 4 shows a layout of the whole label sheet when the cells at the marginal area are moved inwardly of the sheet and thus printed thereon.

Figure 5:
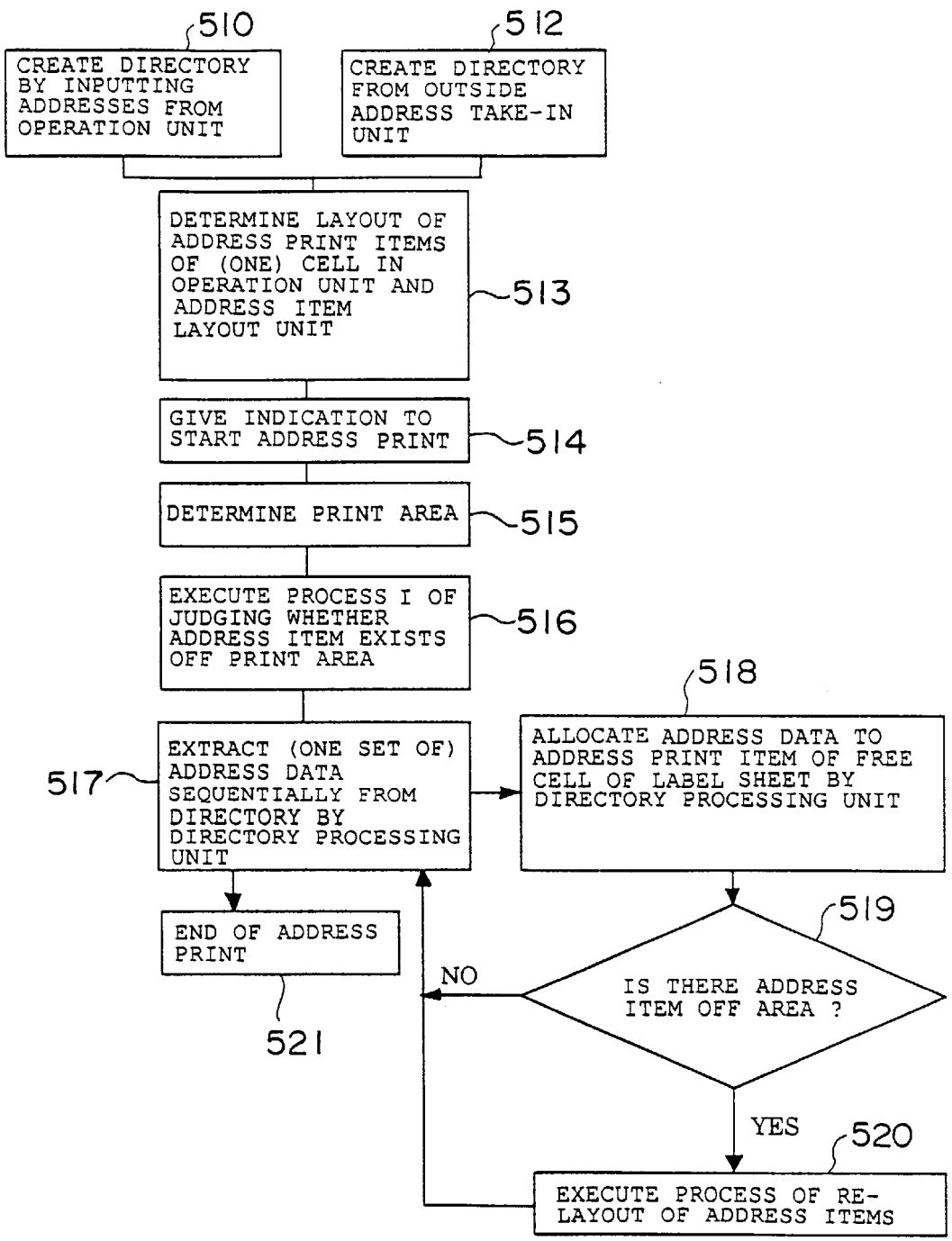
FIG. 5 is a flowchart showing an address print process in an embodiment 1.

FIG. 5 shows a processing flow in this embodiment. The processes in this embodiment will hereinafter be explained referring to FIG. 5.

To start with, the operation unit 101 inputs pieces of address data in sequence, and a directory is created (step 510). The directory may be created by reading CSV data from an outside address take-in unit 110 or data created by other applications (512).

Next, the operation unit 101 and the address item layout unit 107 set a layout of the address print item in one single cell (513). This is executed specifically by a process of displaying a menu of the print items on the display unit 102, and determining the print items by use of a mouse etc.

Next, the operator indicates a start of the address print through the operation unit 101 (514).

Upon the indication of starting the print, the CPU 103 determines a print area from the unprintable area information and the layout information of the printing apparatus 121 (515).

Subsequently, the directory processing unit 105 judges based on a detected result of the print area detecting unit 108 whether or not the address items exist off the print area (which implies that address items exist in the marginal area 205) (516). This judgement step 516 will be explained in details with reference to FIG. 6. Herein, however, it follows that the state flag (see FIGS. 13 and 15) of the relevant item is set to [off-area] if any one of the print items is overlapped with the marginal area 205 (as shown in FIG. 2(a)).

In this embodiment, as in step 516, it is judged from the state of layout of the respective items of the cells on the whole label sheet whether or not the address item is overlapped with the area off the print area (which is the marginal area 205).

Next, the directory processing unit 105 extracts one set of address data from the director data storage unit 113 (517). Then, the directory processing unit 105 allocates the address data to the address print item of an unprinted cell on the label sheet (518).

Subsequently, the directory processing unit 105, referring to the state flag 1901 of the address data, judges whether or not [off-area] is set in any one of the address items (whether or not there is an item of which the print is overlapped with the marginal area) (519). In this case, if any one of the address items is set as [off-area], the processing proceeds to step 520, wherein the address items are re-laid out (520). Further, all the state flags of the address items are set to [off-area], the relevant address data are transmitted to the address print processing unit 109, and the processing returns to step 517.

Then, when all the address data are printed, the processing comes to an end (521).

Figure 6:
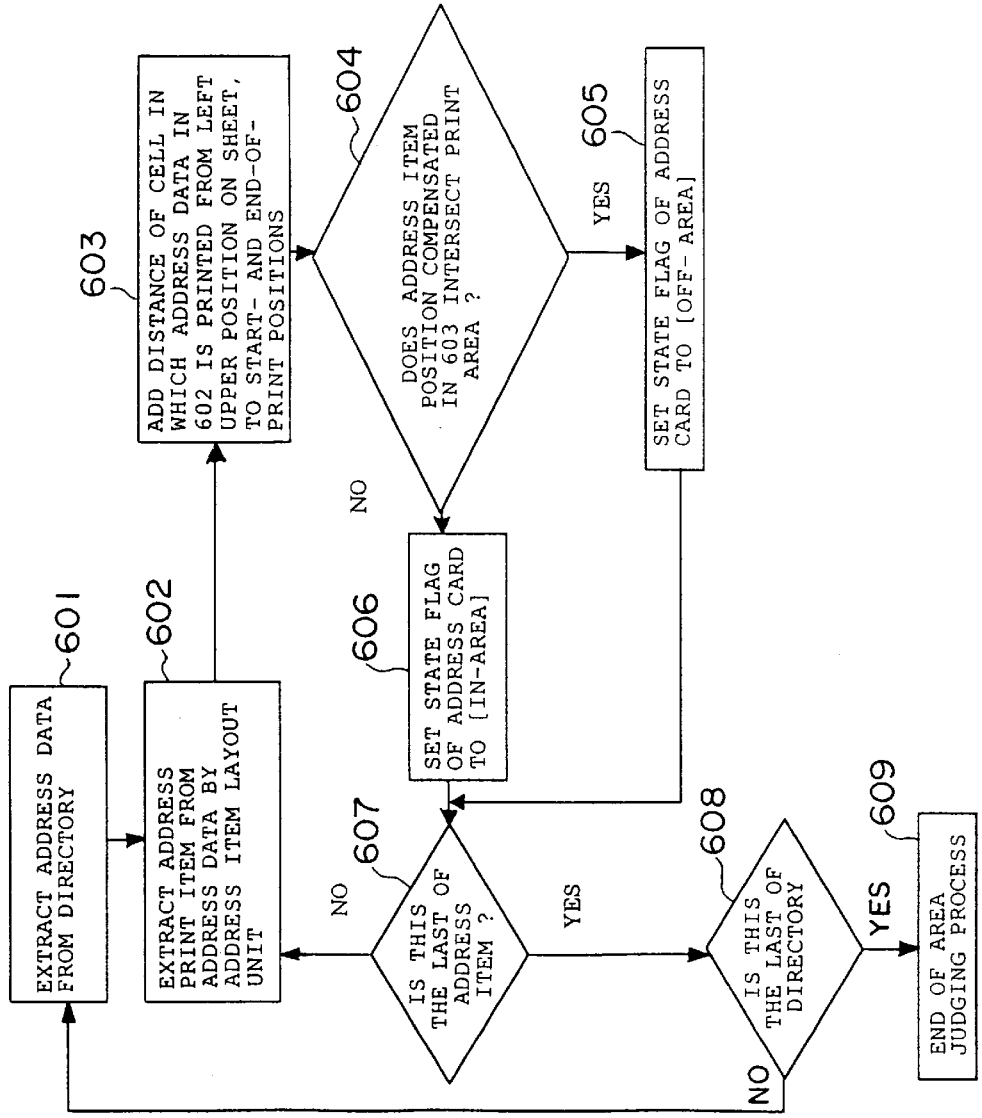
FIG. 6 is a flowchart showing a process of judging whether or not an address item exists off a print area in the embodiment 1.

FIG. 6 is a flowchart showing details of the judgement step 516 in FIG. 5. In this judging process, to begin with, the address data are extracted from the directory data storage unit 13 (601). Next, the address item layout unit 107 extracts the address print items (which are herein the post-code item 201, the address item 202, the name item 203 and the customer bar code item 204) from the address data (602).

Subsequently, based on the address data extracted in step 603, distances of the cells in which to print the address data from a left upper position on the label sheet, are added to the start- and end-of-print positions of the address items shown in FIGS. 15–18 (603).

Next, with reference to the print area obtained in step 515, it is judged based on the address item position (the xy coordinates) calculated in step 603 whether or not the print positions of those items intersect the marginal area 205 (604). Herein, if any one of the items intersects the marginal area 205, this implies a case where the relevant address item can not be properly printed within the area on the label sheet, and therefore [off-area] is set in the state flag 1901 of the relevant address item.

Whereas if the print position of the relevant address item does not intersect the marginal area 205, the relevant address item is properly printed in the area on the label sheet, and hence the state flag 1901 of the relevant address item is set to [in-area] (606).

When the setting of the state flag is thus completed with respect to all the address items and all pieces of address data, the judging process is completed (607, 608, 609).

Figure 7:
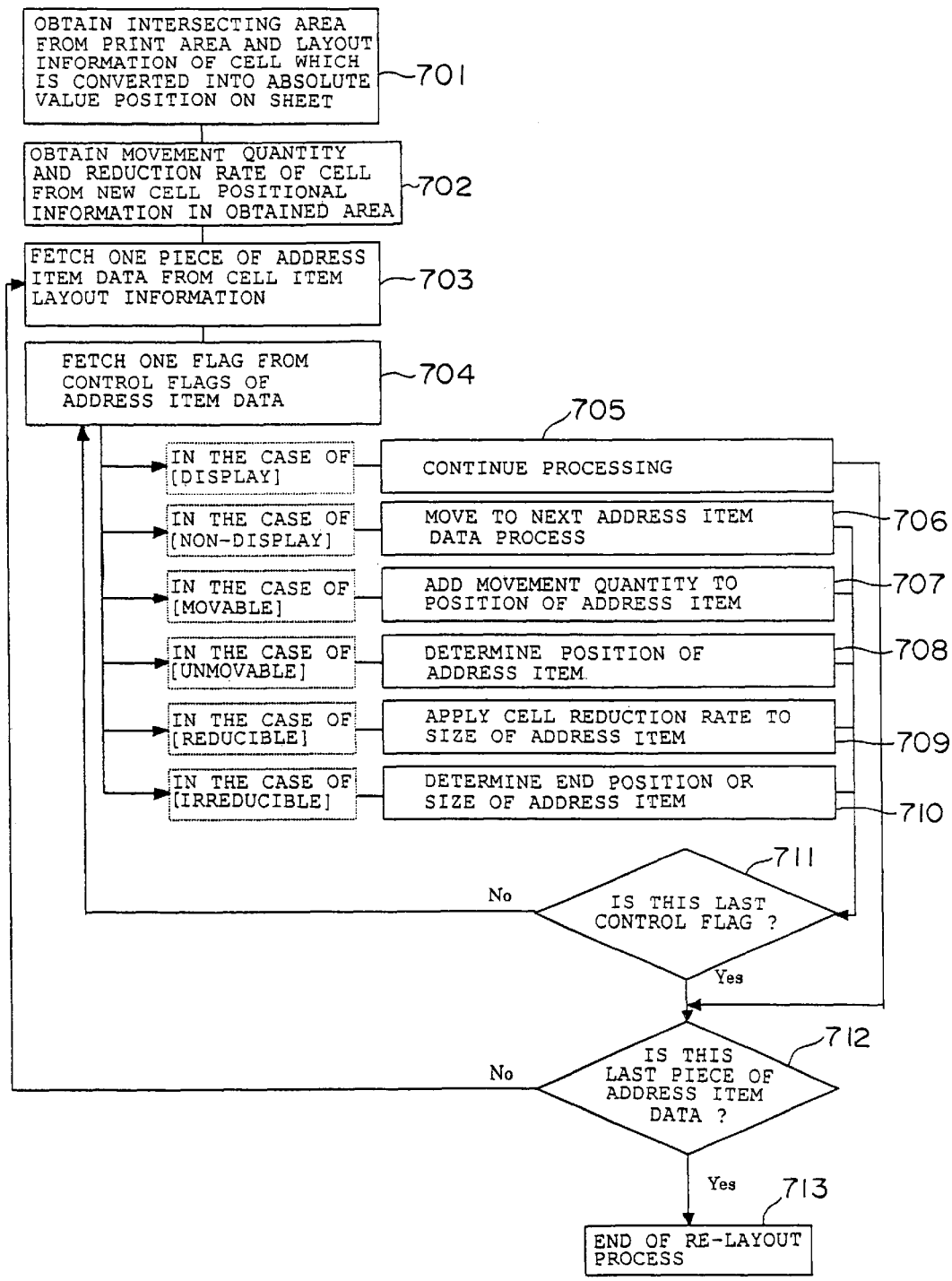
FIG. 7 is a flowchart showing a re-layout process in the address process in the embodiment 1.

FIG. 7 is a flowchart showing details of the address item re-layout processing step 520 in FIG. 5.

Herein, the processes in this flowchart are executed if the state flag 1901 of any one of the address items is set to [off-area] in step 519 in FIG. 5.

At the first onset, there is obtained an area of the cell containing the address item of which the state flag 1901 is set to [off-area], is overlapped with the marginal area 205 (701).

Next, there are obtained such a cell movement quantity and a cell reduction rate as to attain a state where the cell is not overlapped with the marginal area 205 (701). To be specific, when in the state shown in FIG. 2(a), the whole cell is moved by $-\Delta x$, $-\Delta y$, whereby all the items, as shown in FIG. 2(b), come to [in-area]. Further, when the whole cell shown in FIG. 2(a) is reduced by approximately 80%, as illustrated in FIG. 2(c), all the items come to [in-area].

Next, the address item compensation processing unit 106 reads one piece of address item data (e.g., the customer bar code item 204) of the relevant cell from the cell item layout information storage unit 112 (see FIG. 17). Herein, the control flag 1701 of this piece of address item data is read. If the control flag 1701 herein indicates [display] and [movable], the movement quantity ($-\Delta x$, $-\Delta y$) calculated in step 702 is added, thus setting a print re-layout position (705, 707).

Further, if the control flag 1701 indicates [display] and [reducible], the reduction rate (80%) calculated in step 702 is given as a multiplier to obtain a print re-layout position of the cell (705, 709).

Moreover, if the control flag 1701 indicates the [display] state, [movable] and [reducible], for example, at first, the calculated movement quantity ($-\Delta x$, $-\Delta y$) is added to each item of the cell, and it is judged whether or not a result of this addition is off the position of the relevant cell. As a result of this judgement, if not off the position of the relevant cell, this may be determined to be a print re-layout position. Whereas if off the position of the relevant cell, a reduction rate falling within the size of the relevant cell is obtained, and is given as a multiplier, thus setting a print re-layout position of the cell.

Note that if the control flag 1701 indicates [non-display], the re-layout process is not executed at all, and the printing process is executed in the position as it is (corresponding to the state shown in FIG. 2 (*a*)

Further, if the control flag 1701 indicates [unmovable], the movement quantity calculated in step 702 does not reflect in the re-layout. If the control flag 1701 indicates [irreducible], the reduction rate calculated in step 702 does not reflect in the re-layout either.

Moreover, if the control flag indicates [movable] and [reducible], the moving process may be overlapped with the reducing process.

Thus, the check of all the control flags 1701 of all the address items is completed, and the compensation position and the reduction rate are set (or non-setting) (711–713), the re-layout process (step 520 in FIG. 5) of the address items is completed.

Note that in step 515 in FIG. 5 in accordance with the embodiment 1, the print area is determined from the unprintable area and the layout information of the printing apparatus 121 on the occasion of the determination of the print area but may also be set, by displaying an input screen of a print area range as shown in FIG. 19 on the display unit 102 and making the operator set the unprintable area (the marginal area 205) on the label sheet, based on a content of this setting and the layout information.

Embodiment 2

Figure 8:
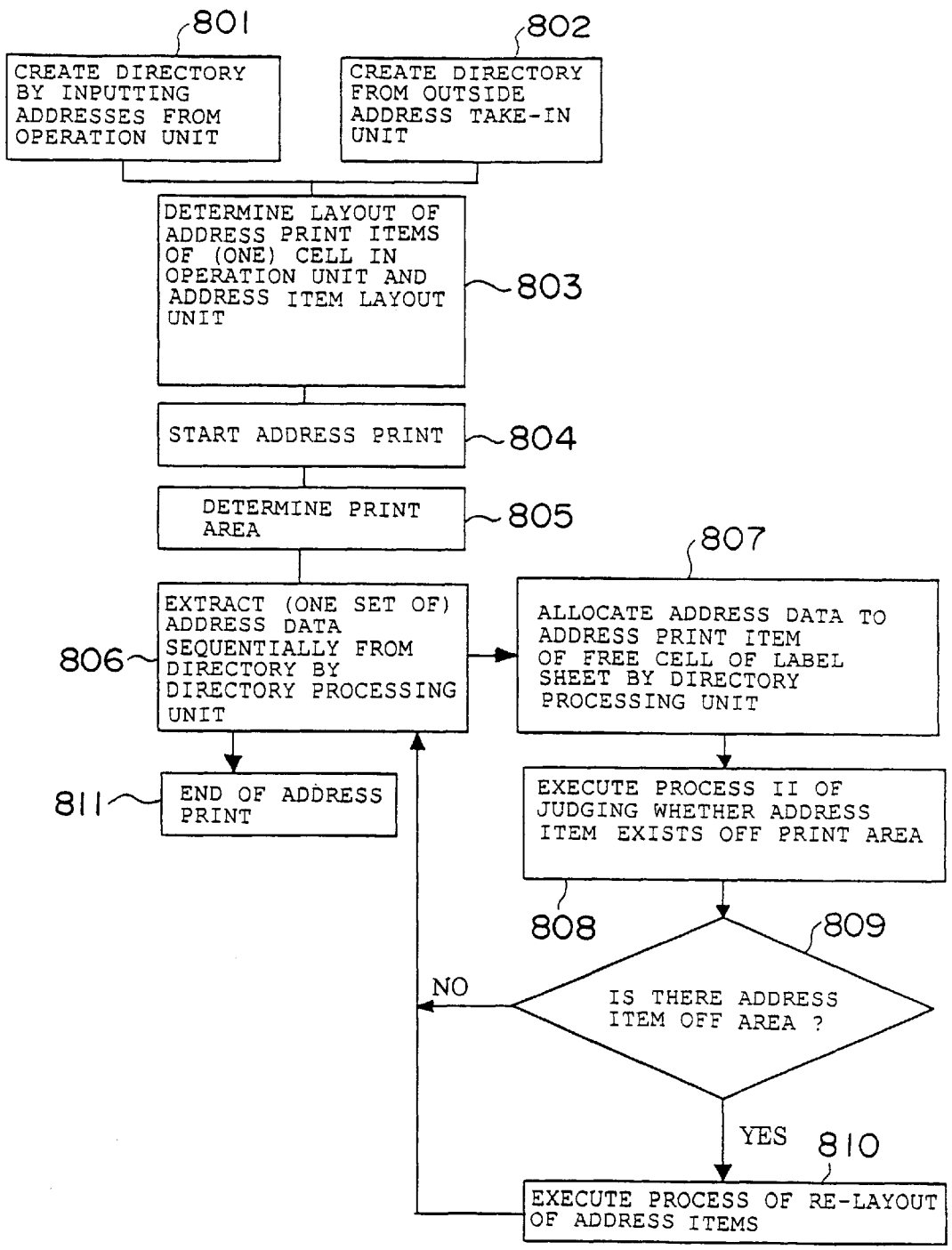
FIG. 8 is a flowchart showing the address print process in an embodiment 2.

FIG. 8 is a processing flowchart showing an embodiment 2 of the present invention.

To start with, pieces of address data are inputted sequentially from the operation unit 101, thereby creating a directory (step 801). This directory may also be created by reading the CSV data from the outside address take-in unit 110 and data created by other applications (802).

Next, the operation unit 101 and the address item layout unit 107 set a layout of the address print item in one single cell (803). This is executed specifically by a process of displaying a menu of the print items on the display unit 102, and determining the print items by use of a mouse etc.

Next, the operator indicates a start of the address print through the operation unit 101 (804).

Upon the indication of starting the print, the CPU 103 determines a print area from the unprintable area information and the layout information of the printing apparatus 121 (805).

Subsequently, the directory processing unit 105 extracts one set of address data from the director data storage unit 113 (806). Then, the directory processing unit 105 allocates the address data to the address print item of an unprinted cell on the label sheet (807).

Next, the directory processing unit 105 judges whether or not the address item exists off the print area on the label sheet 1001 (808). This judging step 808 will be described in details referring to FIG. 9.

In the embodiment 1, it is judged based on the layout state of the respective items of the cells on the, entire label sheet whether or not the address item is overlapped the area off the print area (which is the marginal area 205) (step 516 in FIG. 5). By contrast, according to the embodiment 2, the above judgement is made when cells are developed on the label sheet (step 807).

Next, referring to the state flag 1901 of, the directory data set in the judging step 808, it is judged whether or not [off-area] is set in any one of the address items (whether or not there is an item of which the print is overlapped with the marginal area) (809).

In this case, if any one of the address items is set as [off-area], the processing proceeds to step 810, wherein the address items are re-laid out (810). Further, all the state flags of the address items are set to [in-area], the relevant address data are transmitted to the address print processing unit 109, and the processing returns to step 806.

Then, when all the address data are printed, the processing comes to an end (811).

Figure 9:
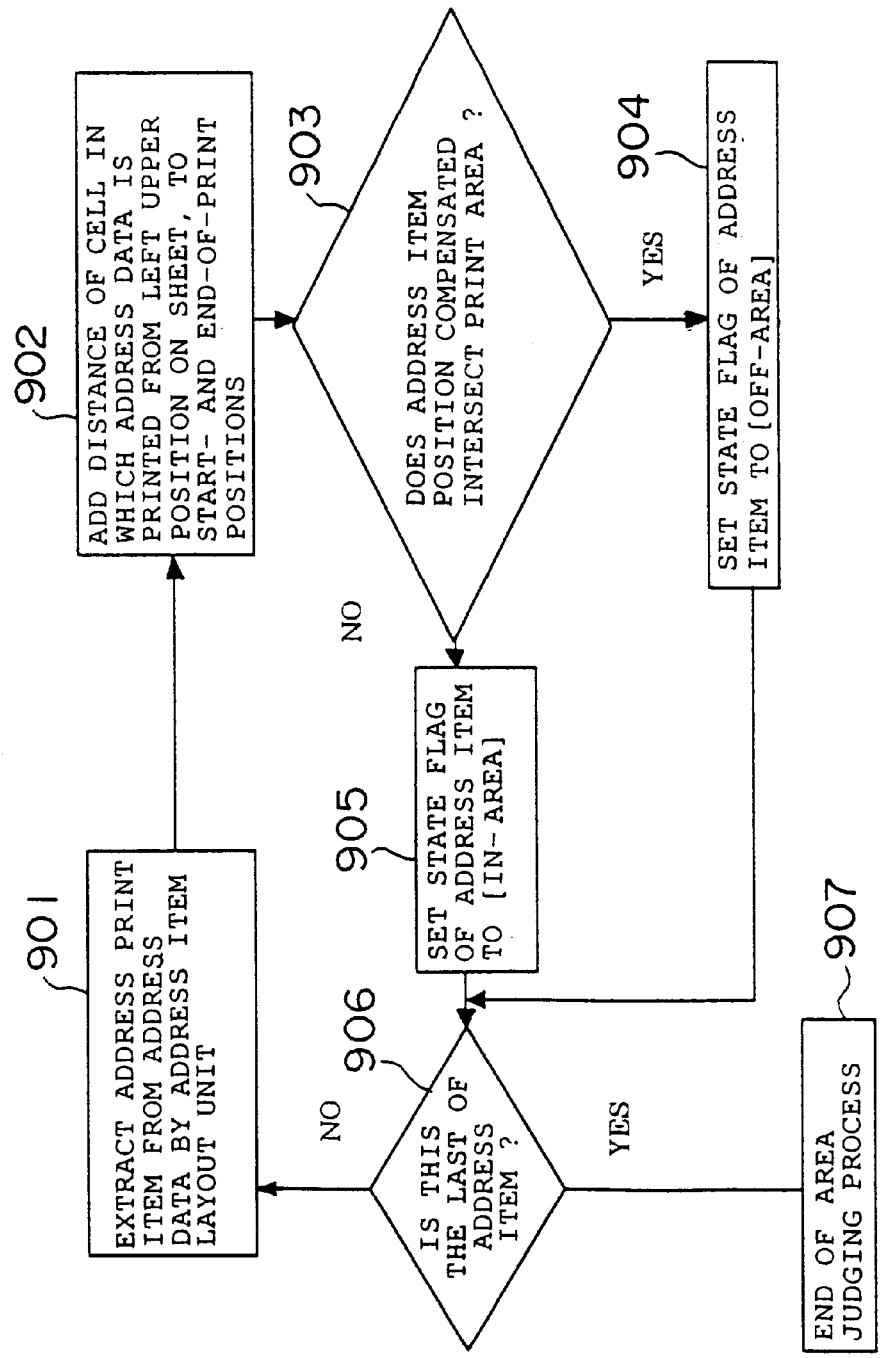
FIG. 9 is a flowchart showing the process of judging whether or not an address item exists off the print area in the embodiment 2.

FIG. 9 is a flowchart showing details of the judgement step 808 in FIG. 8.

To begin with, the address item layout unit 107 extracts the address items from the address data (901).

Subsequently, based on the address data extracted in step 107, distances of the cells in which to print the address data from a left upper position on the label sheet, are added to the start- and end-of-print positions of the address items shown in FIGS. 15–18 (902).

Next, with reference to the layout information (FIG. 12) in the sub-storage unit 104, it is judged based on the address item position (the xy coordinates) calculated in step 603 whether or not the print positions of those items intersect the marginal area 205 (903). Herein, if any one of the items intersects the marginal area 205, this implies a case where the relevant address item can not be properly printed within the area on the label sheet, and therefore [off-area] is set in the state flag 1901 of the relevant address item.

Whereas if the print position of the relevant address item does not intersect the marginal area 205, the relevant address item is properly printed in the area on the label sheet, and hence the state flag 1901 of the relevant address item is set to [in-area] (905).

When the setting of the state flag is thus completed with respect to all the address items, the judging process is completed (906, 907).

Note that in step 805 in FIG. 8 in accordance with the embodiment 2, the print area is determined from the unprintable area and the layout information of the printing apparatus 121 on the occasion of the determination of the print area but may also be set, by displaying the input screen of the print area range as shown in FIG. 19 on the display unit 102 and making the operator set the unprintable area (the marginal area 205) on the label sheet, based on a content of this setting and the layout information.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A print controller comprising:

an obtain unit obtaining an unprintable area on a print medium;

a judge unit judging whether or not a plurality of data to be printed shall be printed in the unprintable area; and a control unit controlling, when judging that the plurality of data to be printed shall be printed in the unprintable area, only the print of one or more pieces of data within the plurality of data to be printed which extends to within the unprintable area.

2. A print controller according to claim 1, wherein said control unit controlling the print of the one or more pieces of data within the plurality of data compensates a print position of the one or more pieces of data within the plurality of data.

3. A print controller according to claim 1, wherein said control unit controlling the print of the one or more pieces of data within the plurality of data determines such a movement quantity that the one or more pieces of data within the plurality of data does not extend to within the unprintable area, and shifts the print position of the one or more pieces of data within the plurality of data in accordance with the movement quantity.

4. A print controller according to claim 1, wherein said control unit controlling the print of the one or more pieces of data within the plurality of data determines such a reduction rate that the one or more pieces of data within the plurality of data does not extend to within the unprintable area, and reduces the one or more pieces of data within the plurality of data in accordance with the reduction rate.

5. A print controller according to claim 1, wherein the plurality of data to be printed is data allocated to each item of a cell composed of a combination of a plurality of items, and the one or more pieces of data within the plurality of data is data allocated to each item.

6. A print controller according to claim 5, wherein said control unit controlling the print of the one or more pieces of data within the plurality of data determines such a movement quantity that each item of the cell does not extend to within the unprintable area, and shifts a print position of the item in accordance with the movement quantity.

7. A print controller according to claim 5, wherein said control unit controlling the print of the fragment of data determines such a reduction rate that each item of the cell does not extend to within the unprintable area, and reduces the item in accordance with the reduction rate.

8. A print controller comprising:

an obtain unit obtaining an unprintable area on a print medium;

a judge unit judging whether or not a plurality of data to be printed shall be printed in the unprintable area;

a control unit controlling, when judging that the plurality of data to be printed shall be printed in the unprintable area, the print of one or more pieces of data within the plurality of data which extends to within the unprintable area; and a store unit storing a control flag showing whether or not a shift print is allowed per item, wherein the plurality of data to be printed is data allocated to each item of a cell composed of a combination of a plurality of items, and the one or more pieces of data within the plurality of data is data allocated to each item, wherein said control unit controlling the print of the one or more pieces of data within the plurality of data determines such a movement quantity that each item of the cell does not extend to within the unprintable area, and shifts a print position of the item in accordance with the movement quantity, and wherein said control unit controlling the print of the one or more pieces of data within the plurality of data shifts each item on the basis of the control flag.

9. A print controller comprising:

an obtain unit obtaining an unprintable area on a print medium;

a judge unit judging whether or not a plurality of data to be printed shall be printed in the unprintable area;

a control unit controlling, when judging that the plurality of data to be printed shall be printed in the unprintable area, the print of one or more pieces of data within the plurality of data which extends to within the unprintable area; and a store unit storing a control flag showing whether or not a reduction print is allowed per item, wherein the plurality of data to be printed is data allocated to each item of a cell composed of a combination of a plurality of items, and the one or more pieces of data within the plurality of data is data allocated to each item, wherein said control unit controlling the print of the one or more pieces of data within the plurality of data determines such a reduction rate that each item of the cell does not extend to within the unprintable area, and reduces the item in accordance with the reduction rate, and wherein said control unit controlling the print of the one or more pieces of data within the plurality of data reduces each item on the basis of the control flag.

10. A print controller according to claim 5, wherein said judge unit judging, based on layout position information of cell items on said print medium, whether or not the plurality of data to be printed is printed in the unprintable area.

11. A print controller comprising:

an obtain unit obtaining an unprintable area on a print medium;

a judge unit judging whether or not a plurality of data to be printed shall be printed in the unprintable area; and a control unit controlling, when judging that the plurality of data to be printed shall be printed in the unprintable area, the print of one or more pieces of data within the plurality of data which extends to within the unprintable area, wherein the plurality of data to be printed is data allocated to each item of a cell composed of a combination of a plurality of items, and the one or more pieces of data within the plurality of data is data allocated to each item, and wherein the data allocated to the cell item contains a state flag showing whether to extend to within the unprintable area or not, and said judge unit judging based on the state flag whether or not the plurality of data to be printed is printed in the unprintable area.

12. A print controller according to claim 1, wherein said obtain unit obtaining the unprintable area on said print medium corresponding to a printing apparatus.

13. A print controller apparatus according to claim 1, further comprising:

a set unit setting the unprintable area by a user, wherein said obtain unit obtaining the unprintable area set by the user.

14. A print controlling method comprising.

obtaining an unprintable area on a print medium;

judging whether or not data to be printed is printed in the unprintable area; and controlling, when judging that the data to be printed is printed in the unprintable area, only the print of a fragment of the data to be printed which extends to within the unprintable area.

15. A print controlling method according to claim 14, wherein said controlling the print of the one or more pices of data within the plurality of data involves determining such a movement quantity that the one or more pices of data within the plurality of data does not extend to within the unpritable area, and shifting the print position of the one or more pice of data within the plurality of data in accordance with the movement quantity.

16. A print controlling method according to claim 14, wherein said controlling the print of the one or more pieces of data within the plurality of data involves determining such a reduction rate that the one or more pieces of data within the plurality of data does not extend to within the unprintable area, and reducing the one or more pieces of data within the plurality of data in accordance with the reduction rate.

17. A print controlling method according to claim 14, wherein the plurality of data to be printed is data allocated to each item of a cell composed of a combination of a plurality of items, and the one or more pieces of data within the plurality of data is data allocated to each item.

18. A print controlling method according to claim 17, wherein said controlling the print of the one or more pieces of data within the plurality of data involves determining such a movement quantity that each item of the cell does not extend to within the unprintable area, and shifting a print position of the item in accordance with the movement quantity.

19. A print controlling method according to claim 17, wherein said controlling the print of the one or more pieces of data within the plurality of data involves determining such a reduction rate that each item of the cell does not extend to within the unprintable area, and reducing the item in accordance with the reduction rate.

20. A print controlling method comprising:
obtaining an unprintable area on a print medium;
judging whether or not a plurality of data to be printed shall be printed in the unprintable area; and
controlling, when judging that the plurality of data to be printed shall be printed in the unprintable area, the print of one or more pieces of data within the plurality of data which extends to within the unprintable area,
wherein the plurality of data to be printed is data allocated to each item of a cell composed of a combination of a plurality of items, and the one or more pieces of data within the plurality of data is data allocated to each item,
wherein said controlling the print of the one or more pieces of data within the plurality of data involves determining such a movement quantity that each item of the cell does not extend to within the unprintable area, and shifting a print position of the item in accordance with the movement quantity, and
wherein said controlling the print of the one or more pieces of data within the plurality of data involves moving each item on the basis of a control flag showing whether or not a shift print is allowed per item.

21. A print controlling method comprising:
obtaining an unprintable area on a print medium;
judging whether or not a plurality of data to be printed shall be printed in the unprintable area; and
controlling, when judging that the plurality of data to be printed shall be printed in the unprintable area, the print of one or more pieces of data within the plurality of data which extends to within the unprintable area,
wherein the plurality of data to be printed is data allocated to each item of a cell composed of a combination of a plurality of items, and the one or more pieces of data within the plurality of data is data allocated to each item,
wherein said controlling the print of the one or more pieces of data within the plurality of data involves determining such a reduction rate that each item of the cell does not extend to within the unprintable area, and reducing the item in accordance with the reduction rate, and
wherein said controlling the print of the one or more pieces of data within the plurality of data involves reducing each item on the basis of a control flag showing whether or not a reduction print is allowed per item.

22. A recording medium, readable by a computer, recorded with a program for making said computer execute:
obtaining an unprintable area on a print medium;
judging whether or not a plurality of data to be printed is printed in the unprintable area; and
controlling, when judging that the plurality of data to be printed is printed in the unprintable area, only the print of one or more pieces of data within the plurality of the data to be printed which extends to within the unprintable area.

23. A recording medium according to claim 22, wherein said controlling the print of the one or more pieces of data within the plurality of data involves determining such a movement quantity that the one or more pieces of data within the plurality of data does not extend to within the unprintable area, and shifting the print position of the one or more pieces of data within the plurality of data in accordance with the movement quantity.

24. A recording medium according to claim 22, wherein said controlling the print of the one or more pieces of data within the plurality of data involves determining such a reduction rate that the one or more pieces of data within the plurality of data does not extend to within the unprintable area, and reducing the one or more pieces of data within the plurality of data in accordance with the reduction rate.

25. A recording medium according to claim 22, wherein the plurality of data to be printed is data allocated to each item of a cell composed of a combination of a plurality of items, and the one or more pieces of data within the plurality of data is data allocated to each item.

26. A recording medium according to claim 25, wherein said controlling the print of the one or more pieces of data within the plurality of data involves determining such a movement quantity that each item of the cell does not extend to within the unprintable area, and shifting a print position of the item in accordance with the movement quantity.

27. A recording medium according to claim 25, wherein said controlling the print of the one or more pieces of data within the plurality of data involves determining such a reduction rate that each item of the cell does not extend to within the unprintable area, and reducing the item in accordance with the reduction rate.

28. A recording medium, readable by a computer, recorded with a program for making said computer execute:
obtaining an unprintable area on a print medium;
judging whether or not a plurality of data to be printed shall be printed in the unprintable area; and controlling, when judging that the plurality of data to be printed shall be printed in the unprintable area, the print of one or more pieces of data within the plurality of data which extends to within the unprintable area, wherein the plurality of data to be printed is data allocated to each item of a cell composed of a combination of a plurality of items, and the one or more pieces of data within the plurality of data is data allocated to each item, wherein said controlling the print of the one or more pieces of data within the plurality of data involves determining such a movement quantity that each item of the cell does not extend to within the unprintable area, and shifting a print position of the item in accordance with the movement quantity, and wherein said controlling the print of the one or more pieces of data within the plurality of data involves moving each item on the basis of a control flag showing whether or not a shift print is allowed per item.

29. A recording medium, readable by a computer, recorded with a program for making said computer execute:

obtaining an unprintable area on a print medium;

judging whether or not a plurality of data to be printed shall be printed in the unprintable area; and controlling, when judging that the plurality of data to be printed shall be printed in the unprintable area, the print of one or more pieces of data within the plurality of data which extends to within the unprintable area, wherein the plurality of data to be printed is data allocated to each item of a cell composed of a combination of a plurality of items, and the one or more pieces of data within the plurality of data is data allocated to each item, wherein said controlling the print of the one or more pieces of data within the plurality of data involves determining such a reduction rate that each item of the cell does not extend to within the unprintable area, and reducing the item in accordance with the reduction rate, and wherein said controlling the print of the one or more pieces of data within the plurality of data involves reducing each item on the basis of the control flag showing whether or not a reduction print is allowed per item.

* * * * *

UNITED STATES PATENT AND TRADEMARK OFFICE
CERTIFICATE OF CORRECTION

PATENT NO.   : 6,674,542 B1
DATED        : January 6, 2004
INVENTOR(S)  : Kaoru Shimamura It is certified that error appears in the above-identified patent and that said Letters Patent is hereby corrected as shown below:

Title page,
Item [57], ABSTRACT,
Line 13, change "ne" to -- not --;

Column 12,
Line 59, after "comprising" delete "." and insert -- : --;
Line 61, after "not" insert -- a plurality of --;
Line 63, before "data" insert -- plurality of --;
Line 64, delete "a";

Column 13,
Line 1, delete "fragment of" and insert -- one or more pieces of data within the plurality of --;
Lines 4 and 6, delete "pices" and insert -- pieces --;
Line 8, delete "unpritable" and insert -- unprintable --;
Line 9, delete "pice" and insert -- pieces --.

Signed and Sealed this

Twenty-fourth Day of January, 2006

JON W. DUDAS
*Director of the United States Patent and Trademark Office*